(12) United States Patent
Lewis et al.

(10) Patent No.: US 8,586,501 B2
(45) Date of Patent: Nov. 19, 2013

(54) CATALYST AND METHOD OF MANUFACTURE

(75) Inventors: Larry Neil Lewis, Scotia, NY (US); Robert Edgar Colborn, Niskayuna, NY (US); Ashish Balkrishna Mhadeshwar, Storrs, CT (US); Dan Hancu, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 44 days.

(21) Appl. No.: 12/897,650

(22) Filed: Oct. 4, 2010

(65) Prior Publication Data
US 2012/0082606 A1   Apr. 5, 2012

(51) Int. Cl.
*B01J 23/00* (2006.01)
*B01J 21/00* (2006.01)
*B01J 20/00* (2006.01)
*B01J 29/00* (2006.01)

(52) U.S. Cl.
USPC .......... 502/348; 502/240; 502/243; 502/258; 502/259; 502/260; 502/22; 502/300; 502/326; 502/327; 502/329; 502/330; 502/332; 502/333; 502/334; 502/335; 502/336; 502/337; 502/338; 502/339; 502/349; 502/350; 502/351; 502/355; 502/415; 502/439; 977/773; 977/775; 977/779

(58) Field of Classification Search
USPC ............. 502/240–439; 977/773, 775, 779
See application file for complete search history.

(56) References Cited

U.S. PATENT DOCUMENTS

| | | | |
|---|---|---|---|
| 5,710,093 A | 1/1998 | Rivas et al. | |
| 7,011,760 B2 * | 3/2006 | Wang et al. | 210/660 |
| 7,081,231 B1 | 7/2006 | Aardahl et al. | |
| 7,090,811 B2 | 8/2006 | Cho et al. | |
| 7,093,429 B1 | 8/2006 | Cho | |
| 7,135,153 B2 | 11/2006 | Bartley et al. | |
| 7,270,738 B2 * | 9/2007 | Euzen et al. | 208/111.3 |
| 7,727,931 B2 * | 6/2010 | Brey et al. | 502/344 |
| 7,790,019 B2 * | 9/2010 | Euzen et al. | 208/108 |
| 7,955,570 B2 * | 6/2011 | Insley et al. | 422/222 |
| 7,989,384 B2 * | 8/2011 | Brey et al. | 502/184 |
| 8,053,387 B2 * | 11/2011 | Flytzani-Stephanopoulus et al. | 502/304 |
| 8,058,202 B2 * | 11/2011 | Brady et al. | 502/184 |
| 8,080,483 B2 * | 12/2011 | Hillhouse et al. | 438/780 |
| 8,137,750 B2 * | 3/2012 | Brey et al. | 427/250 |
| 2004/0076565 A1 | 4/2004 | Gandhi et al. | |
| 2006/0070915 A1 * | 4/2006 | Euzen et al. | 208/111.3 |
| 2006/0167120 A1 * | 7/2006 | Wang et al. | 518/726 |
| 2006/0228283 A1 | 10/2006 | Malyala et al. | |
| 2008/0131345 A1 | 6/2008 | Vitse et al. | |
| 2008/0219906 A1 | 9/2008 | Chen et al. | |
| 2009/0011293 A1 * | 1/2009 | Wood et al. | 429/17 |
| 2009/0068093 A1 | 3/2009 | Cho et al. | |
| 2009/0074641 A1 | 3/2009 | Lewis et al. | |

(Continued)

OTHER PUBLICATIONS

U.S. Appl. No. 12/550,970, filed Aug. 31, 2009, Lewis, et al.

(Continued)

*Primary Examiner* — Cam N. Nguyen
(74) *Attorney, Agent, or Firm* — Jean K. Testa

(57) ABSTRACT

According to various embodiments, a catalyst composition includes a catalytic metal secured to a porous substrate. The substrate has pores that are templated. The substrate is a product of adding a substrate precursor to a water-in-oil microemulsion including a catalytic metal salt, a solvent, a templating agent, and water.

9 Claims, 5 Drawing Sheets

(56) References Cited

U.S. PATENT DOCUMENTS

| | | | |
|---|---|---|---|
| 2010/0196236 A1* | 8/2010 | Lewis et al. | 423/239.1 |
| 2010/0196237 A1 | 8/2010 | Yin et al. | |
| 2011/0024723 A1* | 2/2011 | Gradecak et al. | 257/14 |
| 2011/0039692 A1* | 2/2011 | Brooks et al. | 502/339 |
| 2011/0120100 A1* | 5/2011 | Yin et al. | 60/295 |
| 2011/0209466 A1* | 9/2011 | Yin et al. | 60/301 |
| 2011/0239622 A1* | 10/2011 | Hancu et al. | 60/274 |

OTHER PUBLICATIONS

Bao, X., et al; "Synthesis of Hydroxyapatite/Alumina Nanocomposites Via Microemulsions," 27$^{th}$ International Cocoa Beach Conference on Advanced Ceramics and Composites: A; Ceramic Engineering & Science Proceedings; vol. 24, Issue 3; pp. 51-56; 2003 (7 pages).

Chandradass, J., et al; "Synthesis and Characterization of Alumina Nanoparticles by Igepal CO-520 Stabilized Reverse Micelle and Sol-Gel Procesing," Materials and Manufacturing Processes, 23:494-498; 2008 (5 pages).

Flura, A., et al; "Role of the alumina surface properties on the ammonia production during the NOx SCR with ethanol over Ag/Al$_2$O$_3$ catalysts," presented during the Sixth Tokyo Conference on Advanced Catalytic Science and Technology (TOCAT6) and the Fifth Asia Pacific Congress on Catalysis (APCAT5), Sapporo, Japan; 2010 (2 pages).

Kim, P., et al. "Selective catalytic reduction of NO by monoethanolamine over Ag/Al$_2$O$_3$ catalyst," presented during the the Sixth Tokyo Conference on Advanced Catalytic Science and Technology (TOCAT6) and the Fifth Asia Pacific Congress on Catalysis (APCAT5), Sapporo, Japan, 2010 (2 pages).

Parvulescu, V. I., et al; "Sol-gel entrapped nano silver catalysts-correlation between active silver species and catalytic behavior," Journal of Catalysis; pp. 1-9; 2010 (9 pages).

Shimokawabe, M., et al. "SCR of NO by DME over Al$_{2O3}$ based catalysts: Influence of noble metals and Ba additive on low-temperature activity," presented duting the Sixth Tokyo Conference on Advanced Catalytic Science and Technology (TOCAT6) and the Fifth Asia Pacific Congress on Catalysis (APCAT5), Sapporo, Japan; 2010 (2 pages).

Theis, J.; "SCR Catalyst Systems Optimized for Lightoff and Steady-State Performance," presented during the SAE World Congress & Exhibition, Detroit, MI; pp. 383-392;2009 (10 pages).

Parks, J.E., II, et al.; "NOX Reduction with Natural Gas for Lean Large-Bore Engine Applications Using Lean NOX Trap Aftertreatment," Oak Ridge National Laboratory; available at www.ornl.gov/~webworks/cppr/y2001/rpt/122012.pdf; 2004 (9 pages).

Gilot, P., et al; "A review of NO$_x$ reduction on zeolitic catalysts under diesel exhaust conditions," Fuel, vol. 76, No. 6, pp. 507-515, 1997 (9 pages).

Granger, P., et al. "Catalytic NOx Abatement Systems for Mobile Sources: From Three-Way to Lean Burn after-Treatment Technologies", Chemical Reviews, American Chemical Society, pp. 3155-3207 (Mar. 18, 2011).

Magureanu, M., et al. "In situ study of ozone and hybrid plasma Ag-Al catalysts for the oxidation of toluene: Evidence of the nature of the active sites", Applied Catalysis B: Environmental 104, pp. 84-90 (Feb. 24, 2011).

U.S. Appl. No. 12/899,429, filed Oct. 6, 2010, Winkler et al.
U.S. Appl. No. 12/903,908, filed Oct. 13, 2010, Lewis et al.

* cited by examiner

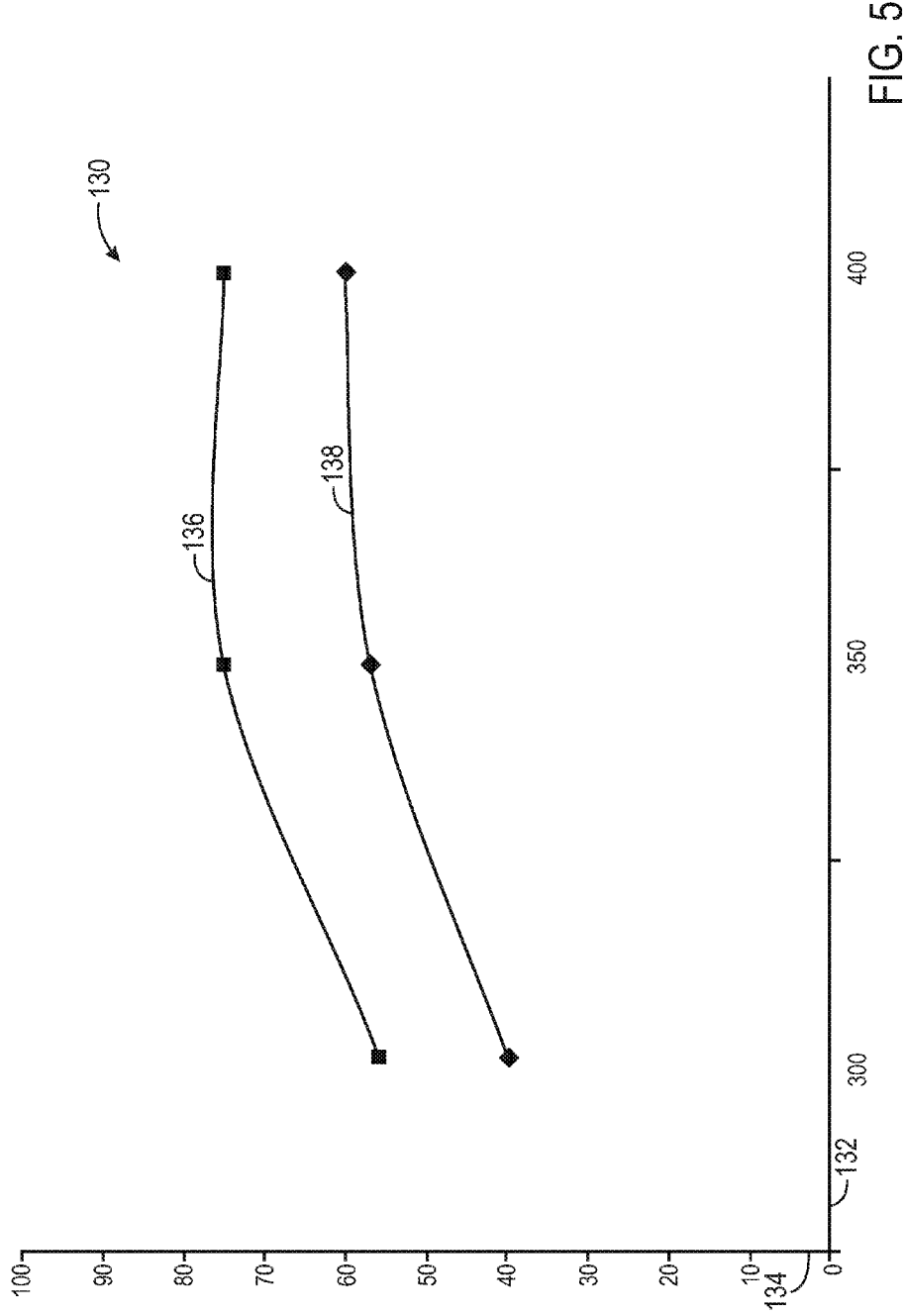

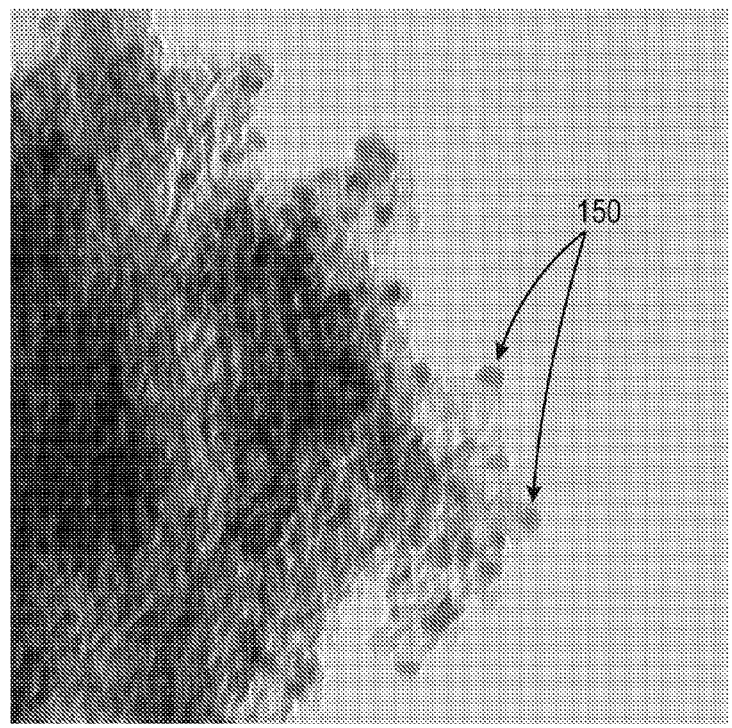
FIG. 6  20 NM
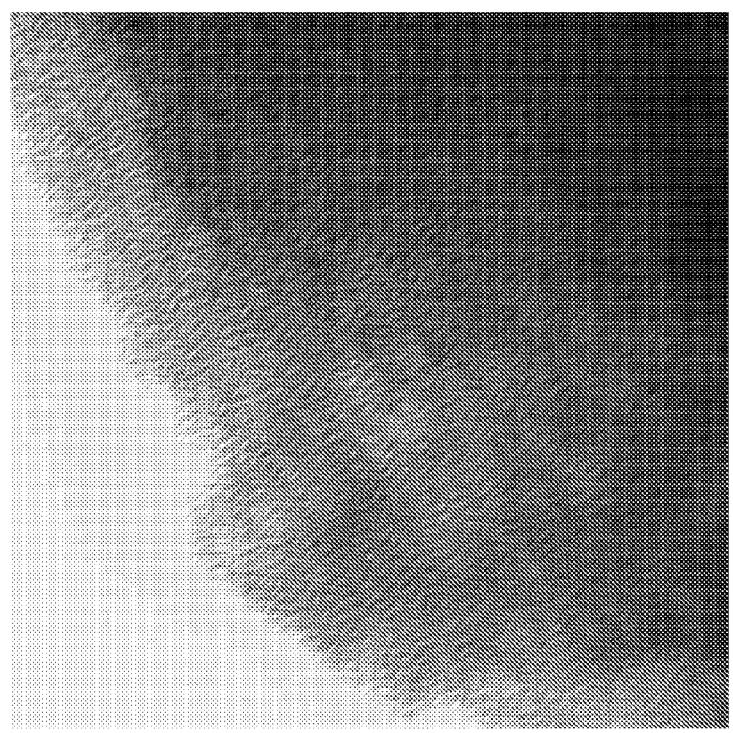
FIG. 7  20 NM

CATALYST AND METHOD OF MANUFACTURE

BACKGROUND OF THE INVENTION

The subject matter disclosed herein relates to catalysts and methods for making catalysts, and more particularly, catalysts for removing nitrogen oxides ($NO_x$) from exhaust gas streams.

Current emission control regulations encourage the use of catalysts in the exhaust systems of vehicles in order to convert carbon monoxide (CO), hydrocarbons (HC), and $NO_x$ produced during engine operation into less harmful exhaust gases. Vehicles equipped with diesel engines may offer the benefit of increased fuel economy. Such vehicles may benefit from exhaust after-treatment systems that employ one or more catalysts to assist in chemically converting $NO_x$, HC, CO, and other pollutants into less harmful compounds prior to discharge of the exhaust gases to the environment.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a catalyst composition includes a catalytic metal secured to a substrate. The substrate has pores that are templated.

In a second embodiment, a catalyst composition includes a catalytic metal secured to a porous substrate. The porous substrate is a product of adding a substrate precursor to a water-in-oil microemulsion. The water-in-oil microemulsion includes a catalytic metal salt, a solvent, a templating agent, and water.

In a third embodiment, a method includes mixing a catalytic metal salt, a templating agent, a solvent, and water to form a water-in-oil microemulsion, adding a substrate precursor to the water-in-oil microemulsion to form a slurry, and calcining the slurry to form a substrate having a porous template that is capable of supporting a catalyst composition.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 5 is a graph showing the $NO_x$ conversion of a catalyst manufactured in accordance with one embodiment of the present invention;

FIG. 6 is a transmission electron microscope (TEM) image of a sample of a catalyst manufactured in accordance with one embodiment of the present invention; and FIG. 7 is a TEM image of a sample of a prior catalyst.

DETAILED DESCRIPTION OF THE INVENTION

Figure 1:
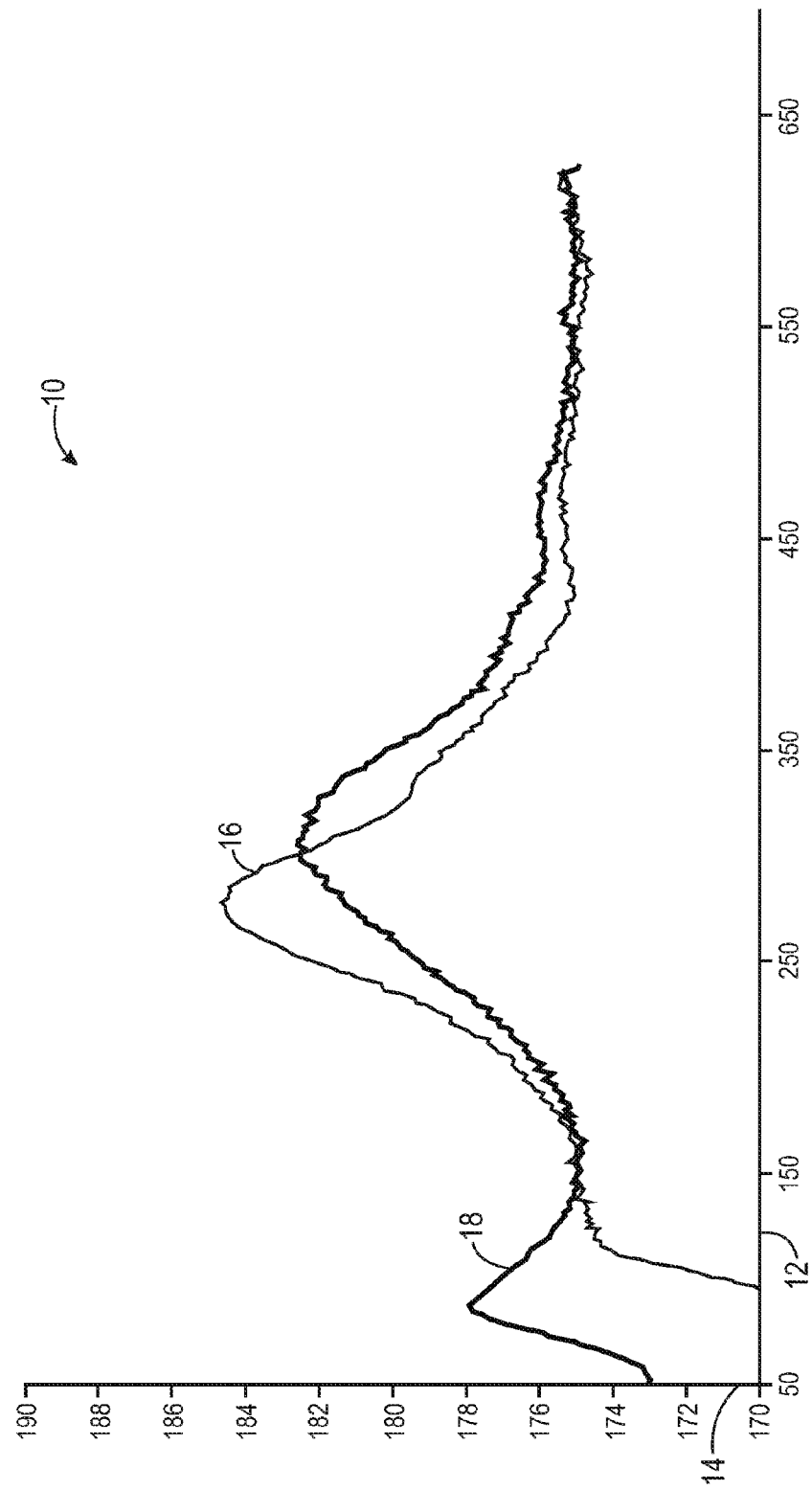
FIG. 1 is a graph showing the temperature-programmed reduction results for a catalyst manufactured in accordance with one embodiment of the present invention.

As used herein, without further qualifiers, "mesoporous" refers to a material that includes pores with diameters in a range from about 2 nanometers to 50 nanometers. A "catalyst" is a substance that can cause a change in the rate of a chemical reaction without itself being consumed in the reaction. A "slurry" is a mixture of a liquid and finely divided particles. A "microemulsion" is a clear, stable, isotropic liquid mixture of oil, water, and a surfactant. The aqueous phase may include salts and/or other ingredients, and the oil may be a complex mixture of different hydrocarbons and olefins. Microemulsions form upon simple mixing of the components. The two basic types of microemulsions are oil dispersed in water (also referred to as direct, oil-in-water, or o/w) and water dispersed in oil (also referred to as reversed, water-in-oil, or w/o). A "powder" is a substance including finely dispersed solid particles. "Templating" refers to a controlled patterning and "templated" refers to determined control of an imposed pattern and may include molecular self-assembly. A "monolith" may be a ceramic block having a number of channels, and may be made by extrusion of clay, binders, and additives that are pushed through a dye to create a structure. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

Disclosed herein is a catalyst composition for reducing $NO_x$ that is present in an exhaust gas stream including emissions generated from combustion in furnaces, ovens, engines, and so forth. When manufactured using methods disclosed herein, the resulting catalyst composition may possess unexpectedly improved catalyst activity for $NO_x$ reduction. For example, catalyst compositions produced using exemplary methods may be about 1.2 times more active than prior catalyst compositions. In other words, catalyst compositions produced using exemplary methods disclosed herein, may convert more $NO_x$ to nitrogen, water, and/or ammonia than prior catalyst compositions. Exemplary catalyst compositions include a catalytic metal disposed on a substrate. The substrate has pores of a size that may be effective to prohibit aromatic species from poisoning the catalyst composition. When the catalyst composition is employed to reduce $NO_x$ generated in emissions from combustion sources, a variety of hydrocarbons can be effectively used as a reductant. In an exemplary embodiment, diesel fuel can be used as a reductant.

Exemplary catalyst compositions disclosed herein may be manufactured by adding a substrate precursor to a water-in-oil microemulsion that includes a catalytic metal salt, a solvent, a suitable templating agent, and water, as described in detail below. In a water-in-oil microemulsion, the water is dispersed in the solvent, i.e. the "oil." The domain size of the water phase may be in the range of approximately 1 nanometer to 100 nanometers. Thus, the chemical reactions to produce the exemplary catalyst compositions may occur within nanodroplets or at the oil/water interface. In certain embodiments, the percentage of water in the water-in-oil microemulsion may be between approximately 15 percent to 55 percent, 20 percent to 50 percent, or 30 percent to 40 percent. A suitable substrate precursor may include an inorganic alkoxide. During preparation, the catalytic metal salt, the templating agent, the solvent, and water are mixed to form a water-in-oil microemulsion. After addition of the substrate precursor, gel is produced in the nanodroplets of water dispersed in the solvent. Thus, the mixture may appear to have properties of a slurry. The slurry or gel is calcined to produce the substrate, with the catalytic metal incorporated into the substrate to produce the catalyst composition. The use of the templating agent in the water-in-oil microemulsion controls pore formation in the substrate.

An average exemplary catalytic composition particle size is less than about 100 nanometers. In one embodiment, the average catalytic composition particle size may be between about 0.1 nanometers to 1 nanometer, 1 nanometer to 5 nanometers, 5 nanometers to 15 nanometers, 15 nanometers to 25 nanometers, 25 nanometers to 50 nanometers, or greater than about 50 nanometers.

Exemplary catalyst compositions may include a catalytic metal. Suitable catalytic metals may include one or more alkali metals, alkaline earth metals, transition metals, and main group metals. Examples of suitable catalytic metals include, but are not limited to, silver, platinum, gold, palladium, iron, nickel, cobalt, gallium, indium, ruthenium, rhodium, osmium, and iridium. An exemplary catalytic metal is silver. In one embodiment, the catalytic metal may include a combination of two or more of the foregoing metals. For example, the catalytic metal may include a promoting metal, which is a metal that enhances the action of a catalyst. In one embodiment, the promoting metal may be selected from the group consisting of gallium, indium, gold, vanadium, zirconium, zinc, tin, bismuth, cobalt, rhodium, platinum, molybdenum, and tungsten. The promoting metal may be present in an amount between about 0.1 weight percent to 20 weight percent, 0.5 weight percent to 15 weight percent, 1 weight percent to 12 weight percent based upon the total weight of the catalyst composition.

The catalytic metals may be present in the catalyst composition in an amount greater than about 0.025 mole percent. The amount selected may be based on end use parameters, economic considerations, desired efficacy, and the like. For example, the amount of catalytic metals in the catalyst composition may be between about 0.025 mole percent to 0.2 mole percent, 0.2 mole percent to 1 mole percent, 1 mole percent to 5 mole percent, 5 mole percent to 10 mole percent, 10 mole percent to 25 mole percent, 25 mole percent to 35 mole percent, 35 mole percent to 45 mole percent, 45 mole percent to 50 mole percent, or greater than about 50 mole percent. An exemplary amount of catalytic metal in the catalyst composition is about 1.5 mole percent to 5 mole percent.

The catalytic metals in the catalyst composition may occur in clusters that may be between about 1 atom to 10 atoms, 2 atoms to 5 atoms, or 2 atoms to 3 atoms in size. Such clusters may be small enough to fit within the pores of the substrate discussed in more detail below. Various methods, such as visible ultraviolet (UV) spectra, may be used to determine the number of atoms in the catalytic metal clusters. In addition, various methods, such as TEM, may be used to confirm that the clusters produced via exemplary methods are about 10 Angstroms (Å) or less in size.

Further, based on temperature-programmed reduction (TPR) tests, certain embodiments of catalytic compositions may be characterized by having both small and large catalytic metal clusters. TPR is a technique for the characterization of solid materials, in which an oxidized catalyst precursor is subjected to a programmed temperature rise while a reducing gas mixture, such as hydrogen, is flowed over the catalyst precursor. TPR results may provide an indirect indication of cluster size. For example, FIG. 1 is a graph 10 showing the TPR results for an exemplary catalytic composition. An x-axis 12 represents temperature in degrees Celsius and a y-axis 14 represents the relative intensity of reduction. Peaks in the graph 10 may be correlated with catalytic metal cluster size. Specifically, low temperature peaks are associated with large catalytic metal clusters and high temperature peaks are associated with small catalytic metal clusters. Curve 16 corresponds to the TPR results for a prior catalyst. As shown, curve 16 has a single peak at about 275 degrees Celsius. Thus, the prior catalyst may have primarily small catalytic metal clusters. Curve 18 corresponds to the TPR results for an exemplary catalyst. As shown, curve 18 has two peaks, with a low temperature peak at about 85 degrees Celsius and a high temperature peak at about 300 degrees Celsius. Thus, certain embodiments of catalytic compositions may have both small and large catalytic metal clusters. Such a combination of both small and large catalytic metal clusters may provide one possible explanation for the unexpectedly improved performance of the exemplary catalytic compositions.

The substrate of the catalyst composition may include an inorganic material. Suitable inorganic materials include, but are not limited to, inorganic oxides, inorganic carbides, inorganic nitrides, inorganic hydroxides, inorganic oxides, inorganic carbonitrides, inorganic oxynitrides, inorganic borides, and inorganic borocarbides. In one embodiment, the inorganic oxide may have hydroxide coatings. In another embodiment, the inorganic oxide may be a metal oxide. The metal oxide may have a hydroxide coating. Other suitable metal inorganic materials include, but are not limited to, one or more metal carbides, metal nitrides, metal hydroxides, metal carbonitrides, metal oxynitrides, metal borides, or metal borocarbides. Metallic cations used in the foregoing inorganic materials can be transition metals, alkali metals, alkaline earth metals, rare earth metals, or the like.

Examples of suitable inorganic oxides that may be used in the substrate include, but are not limited to, silica ($SiO_2$), alumina ($Al_2O_3$), titania ($TiO_2$), zirconia ($ZrO_2$), ceria ($CeO_2$), manganese oxide ($MnO_2$), zinc oxide (ZnO), iron oxides (e.g., FeO, $\beta$-$Fe_2O_3$, $\gamma$-$Fe_2O_3$, $Fe_3O_4$, or the like), calcium oxide (CaO), and manganese dioxide ($MnO_2$ and $Mn_3O_4$). Examples of suitable inorganic carbides include, but are not limited to, silicon carbide (SiC), titanium carbide (TiC), tantalum carbide (TaC), tungsten carbide (WC), hafnium carbide (HfC), or the like. Examples of suitable nitrides include, but are not limited to, silicon nitrides ($Si_3N_4$), titanium nitride (TiN), or the like. Examples of suitable borides include, but are not limited to, lanthanum boride ($LaB_6$), chromium borides (CrB and $CrB_2$), molybdenum borides ($MoB_2$, $Mo_2B_5$ and MoB), tungsten boride ($W_2B_5$), or the like. An exemplary inorganic substrate is alumina. The alumina may be crystalline or amorphous.

As noted above, the substrate is porous. In one embodiment, the average pore size of the substrate is controlled and may be selected to reduce or eliminate poisoning. Poisoning may affect catalytic ability, and may be caused by aromatic species present in the reductant or in the exhaust gas stream. In another embodiment, the average pore size of the substrate is controlled and selected, such that the catalytic metal clusters described above may fit within the pores of the substrate.

The substrate may be mesoporous and have average pore diameters greater than about 2 nanometers. For example, the average pore sizes of the substrate may be between about 2 nanometers to 3 nanometers, 3 nanometers to 5 nanometers, 5 nanometers to 7 nanometers, 7 nanometers to 10 nanometers, 10 nanometers to 15 nanometers, 15 nanometers to 17 nanometers, 17 nanometers to 20 nanometers, 20 nanometers to 25 nanometers, 25 nanometers to 30 nanometers, 30 nanometers to 35 nanometers, 35 nanometers to 45 nanometers, 45 nanometers to 50 nanometers, or greater than about 50 nanometers. The average pore size may be measured using nitrogen adsorption measurements with the Brunauer Emmett Teller (BET) method. The BET theory explains the physical adsorption of gas molecules on a solid surface and serves as the basis for the measurement of the specific surface area of a material. An exemplary substrate is a mesoporous substrate.

The pore size may have a narrow monomodal distribution. For example, the pore size distribution polydispersity index of the pores may be less than about 1.5, 1.3, or 1.1. In one embodiment, the distribution in diameter sizes may be bimodal, or multimodal. The porous materials may be manufactured via a templating process, which is described below.

The pores may have a single point pore volume greater than about 0.5 cm$^3$/gram. For example, the single point pore volume may be between about 0.5 cm$^3$/gram to 0.53 cm$^3$/gram, 0.53 cm$^3$/gram to 0.57 cm$^3$/gram, or 0.57 cm$^3$/gram to 0.6 cm$^3$/gram. An exemplary single point pore volume may be about 0.53 cm$^3$/gram.

The pores may be distributed in a controlled and repeating fashion to form a pattern. In one embodiment, the pore arrangement is regular and not random. The pores may be ordered and may have an average periodicity. The average pore spacing may be controlled and selected based on the surfactant selection. In one embodiment, the pores are unidirectional, are periodically spaced, and have an average periodicity. The pores of the porous substrate may have a spacing of greater than about 20 Å. For example, the spacing of the pores may be between about 20 Å to 40 Å, 40 Å to 50 Å, 50 Å to 100 Å, 100 Å to 150 Å, 150 Å to 200 Å, 200 Å to 250 Å, 250 Å to 300 Å, or greater than about 300 Å. The average pore spacing (periodicity) may be measured using small angle X-ray scattering.

The porous substrate may have a surface area greater than about 0.5 m$^2$/gram. For example, the surface area may be between about 0.5 m$^2$/gram to 10 m$^2$/gram, 10 m$^2$/gram to 100 m$^2$/gram, 100 m$^2$/gram to 200 m$^2$/gram, or 200 m$^2$/gram to 1200 m$^2$/gram. In one embodiment, the porous substrate has a surface area that may be between about 0.5 m$^2$/gram to 200 m$^2$/gram. In another embodiment, the porous substrate has a surface area that may be between about 200 m$^2$/gram to 250 m$^2$/gram, 250 m$^2$/gram to 500 m$^2$/gram, 500 m$^2$/gram to 750 m$^2$/gram, 750 m$^2$/gram to 1000 m$^2$/gram, 1000 m$^2$/gram to 1250 m$^2$/gram, 1250 m$^2$/gram to 1500 m$^2$/gram, 1500 m$^2$/gram to 1750 m$^2$/gram, 1750 m$^2$/gram to 2000 m$^2$/gram, or greater than about 2000 m$^2$/gram.

The porous substrate may be present in the catalyst composition in an amount that is greater than about 50 mole percent. For example, the amount of porous substrate present in the catalyst composition may be between about 50 mole percent to 60 mole percent, 60 mole percent to 70 mole percent, 70 mole percent to 80 mole percent, 80 mole percent to 90 mole percent, 90 mole percent to 95 mole percent, 95 mole percent to 98 mole percent, 98 mole percent to 99 mole percent, or 99 mole percent to 99.9975 mole percent.

In one method of manufacturing the catalyst composition, the catalytic metal salt, the templating agent, the solvent, and water are mixed in a vessel to form the water-in-oil microemulsion, to which the substrate precursor is added, as described in detail below. The substrate precursor may include an inorganic alkoxide. The resulting slurry or gel may be filtered, washed, dried, and calcined to yield a solid catalyst composition that includes the catalytic metal salt disposed on the porous substrate. In certain embodiments, the slurry or gel may be pyrolyzed prior to calcination, as described below. During the calcination process, the metal salt may be reduced to a catalytic metal. Prior catalyst compositions may use spray drying to form dry powder. However, exemplary catalyst compositions may use calcination instead of spray drying to remove the solvent, templating agent, and other organics, thereby producing a dry powder. Calcination may be simpler, faster, and less expensive than spray drying. Even so, spray drying is an alternative method that may be used in certain embodiments.

The calcination may be conducted at temperatures between about 350 degrees Celsius to 400 degrees Celsius, 400 degrees Celsius to 500 degrees Celsius, 500 degrees Celsius to 600 degrees Celsius, 600 degrees Celsius to 700 degrees Celsius, or 700 degrees Celsius to 800 degrees Celsius. In one embodiment, the calcination is conducted at a temperature of about 550 degrees Celsius. The calcination may be conducted for a period between about 10 minutes to 30 minutes, 30 minutes to 60 minutes, 60 minutes to 1 hour, 1 hour to 10 hours, 10 hours to 24 hours, or 24 hours to 48 hours.

Suitable inorganic alkoxides that may be added to the water-in-oil microemulsion as the substrate precursor include, but are not limited to, one or more of tetraethyl orthosilicate, tetramethyl orthosilicate, aluminum isopropoxide, aluminum tributoxide, aluminum ethoxide, aluminum-tri-sec-butoxide, aluminum tert-butoxide, antimony (III) ethoxide, antimony (III) isopropoxide, antimony (III) methoxide, antimony (III) propoxide, barium isopropoxide, calcium isopropoxide, calcium methoxide, chloro triisopropoxy titanium, magnesium di-tert-butoxide, magnesium ethoxide, magnesium methoxide, strontium isopropoxide, tantalum (V) butoxide, tantalum (V) ethoxide, tantalum (V) ethoxide, tantalum (V) methoxide, tin (IV) tert-butoxide, diisopropoxytitanium bis(acetylacetonate) solution, titanium (IV) (triethanolaminato) isopropoxide solution, titanium (IV) 2-ethylhexyloxide, titanium (IV) bis(ethyl acetoacetato)diisopropoxide, titanium (IV) butoxide, titanium (IV) butoxide, titanium (IV) diisopropoxide bis(2,2,6,6-tetramethyl-3,5-heptanedionate), titanium (IV) ethoxide, titanium (IV) isopropoxide, titanium (IV) methoxide, titanium (IV) tert-butoxide, vanadium (V) oxytriethoxide, vanadium (V) oxytriisopropoxide, yttrium (III) butoxide, yttrium (III) isopropoxide, zirconium (IV) bis(diethyl citrato) dipropoxide, zirconium (IV) butoxide, zirconium (IV) diisopropoxidebis (2,2,6,6-tetramethyl-3,5-heptanedionate), zirconium (IV) ethoxide, zirconium (IV) isopropoxide zirconium (IV) tert-butoxide, zirconium (IV) tert-butoxide, or the like. An exemplary inorganic alkoxide is aluminum sec-butoxide.

After the inorganic alkoxide is added to the water-in-oil microemulsion, the resulting slurry or gel may include the inorganic alkoxide in an amount greater than about 1 weight percent, based on the weight of the slurry or gel. For example, the amount of the inorganic alkoxide in the slurry or gel may be between about 1 weight percent to 5 weight percent, 5 weight percent to 10 weight percent, 10 weight percent to 15 weight percent, 15 weight percent to 20 weight percent, 20 weight percent to 30 weight percent, 30 weight percent to 40 weight percent, 40 weight percent to 50 weight percent, or greater than about 50 weight percent.

Suitable solvents that may be used to form the water-in-oil microemulsion include aprotic polar solvents, polar protic solvents, and non-polar solvents. Suitable aprotic polar solvents may include, but are not limited to, propylene carbonate, ethylene carbonate, butyrolactone, acetonitrile, benzonitrile, nitromethane, nitrobenzene, sulfolane, dimethylformamide, N-methylpyrrolidone, or the like. Suitable polar protic solvents may include, but are not limited to, water, nitromethane, acetonitrile, and short chain alcohols. Suitable short chain alcohols may include, but are not limited to, one or more of methanol, ethanol, propanol, isopropanol, butanol, or the like. Suitable non-polar solvents may include, but are not limited to, cyclohexane, octane, heptane, hexane, benzene, toluene, methylene chloride, carbon tetrachloride, or diethyl ether. Co-solvents may also be used. Exemplary solvents include 2-butanol and 2-propanol.

Solvents may be present in the water-in-oil microemulsion in an amount greater than about 0.5 weight percent. For example, the amount of solvent may be between about 0.5 weight percent to 1 weight percent, 1 weight percent to 5 weight percent, 5 weight percent to 10 weight percent, 10 weight percent to 15 weight percent, 15 weight percent to 20 weight percent, 20 weight percent to 30 weight percent, 30 weight percent to 40 weight percent, 40 weight percent to 50 weight percent, or greater than about 50 weight percent, based on the total weight of the water-in-oil microemulsion. Selection of the type and amount of solvent may affect or control the amount of porosity generated in the catalyst composition, as well as affect or control other pore characteristics.

Modifiers may be used to control hydrolysis kinetics of the inorganic alkoxides and are an optional component of the water-in-oil microemulsion. Suitable modifiers may include, but are not limited to, one or more of ethyl acetoacetate (EA), ethylene glycol (EG), triethanolamine (TA), or the like. In one embodiment, the water-in-oil microemulsion includes a modifier in an amount greater than about 0.1 weight percent, based on the weight of the water-in-oil microemulsion. For example, the amount of modifier present may be between about 0.1 weight percent to 1 weight percent, 1 weight percent to 2 weight percent, 2 weight percent to 3 weight percent, 3 weight percent to 4 weight percent, 4 weight percent to 5 weight percent, or greater than about 5 weight percent.

The templating agents of the water-in-oil microemulsion serve as templates and may facilitate the production of substrates with directionally aligned tubular meso-channel forms, or pores. Control of the pore characteristic may, in turn, provide control of the particle size of catalytic metal by reducing the catalytic metal lability or propensity to agglomerate. The particle size of catalytic metal may be controlled, with respect to pore formation of the porous template, by controlling or affecting one or more of pore size, pore distribution, pore spacing, or pore dispersity.

The water-in-oil microemulsion may include the templating agent in an amount greater than about 0.1 weight percent, based on the weight of the water-in-oil microemulsion. For example, the amount of templating agent present may be between about 0.01 weight percent to 0.2 weight percent, 0.2 weight percent to 1 weight percent, 1 weight percent to 5 weight percent, 5 weight percent to 10 weight percent, 10 weight percent to 25 weight percent, 25 weight percent to 35 weight percent, 35 weight percent to 45 weight percent, 45 weight percent to 50 weight percent, or greater than about 50 weight percent. An exemplary amount of templating agent, based on the weight of the water-in-oil microemulsion, is about 1.5 weight percent to 5 weight percent.

Selection of the type(s) and amounts of the templating agent may affect or control the pore characteristics of the resultant templated substrate. Suitable templating agents may include one or more surfactants. Suitable surfactants may include, but are not limited to, cationic surfactants, anionic surfactants, non-ionic surfactants, or Zwitterionic surfactants. In one embodiment, the templating agent may include one or more cyclic species. Examples of such cyclic species may include crown ethers.

Suitable cationic surfactants may include, but are not limited to, cetyltrimethyl ammonium bromide (CTAB), cetylpyridinium chloride (CPC), polyethoxylated tallow amine (POEA), benzalkonium chloride (BAC), and benzethonium chloride (BZT). Other suitable cationic surfactants may include those having a chemical structure denoted by $CH_3(CH_2)_{15}N(CH_3)_3$—Br, $CH_3(CH_2)_{15}$—$(PEO)_n$—OH where n=2 to 20 and where PEO is polyethylene oxide, $CH_3(CH_2)_{14}COOH$ and $CH_3(CH_2)_{15}NH_2$. Other suitable cationic surfactants may include one or more fluorocarbon surfactants, such as $C_3F_7O(CF_2CF_3CF_2O)_2CFCF_3$—$CONH(CH_2)_3N(C_2H_5)_2CH_3I$) commercially available as FC-4.

Suitable anionic surfactants may include, but are not limited to, one or more of sodium dodecyl sulfate (SDS), ammonium lauryl sulfate, alkyl sulfate salts, sodium laureth sulfate (also known as sodium lauryl ether sulfate (SLES)), alkyl benzene sulfonate, soaps, fatty acid salts, or sodium dioctyl sulfonate (AOT). Suitable Zwitterionic surfactants may include, but are not limited to, dodecyl betaine, dodecyl dimethylamine oxide, cocamidopropyl betaine, or coco amphoglycinate.

Figure 2:
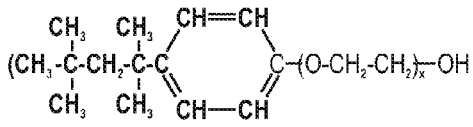
FIG. 2 depicts the chemical structures of various surfactants that can be used in the templating agent in accordance with the technique disclosed herein for manufacturing a catalyst.

Nonionic surfactants may have polyethylene oxide molecules as hydrophilic groups. Suitable ionic surfactants may include, but are not limited to, alkyl poly(ethylene oxide), copolymers of poly(ethylene oxide) and poly(propylene oxide), commercially called Poloxamers or Poloxamines and commercially available under the trade name PLURONICS®. Examples of copolymers of poly(ethylene oxide) are $(EO)_{19}(PO)_{39}(EO)_{11}$, $(EO)_{20}(PO)_{69}(EO)_{20}$, $(EO)_{13}(PO)_{30}(EO)_{13}$, poly(isobutylene)-block-poly(ethylene oxide), poly(styrene)-block-poly(ethylene oxide) diblock copolymers, and block copolymer hexyl-oligo (p-phenylene ethynylene)-poly(ethylene oxide). Additional examples of copolymers of poly(ethylene oxide) are shown in FIG. 2.

Suitable non-ionic surfactants may include, but are not limited to, one or more alkyl polyglucosides, octylphenol ethoxylate, decyl maltoside, fatty alcohols, cetyl alcohol, oleyl alcohol, cocamide monoethanolamine, cocamide diethanolamine, cocamide triethanolamine, 4-(1,1,3,3-tetramethyl butyl)phenyl-poly(ethylene glycol), polysorbitan monooleate, or amphiphilic poly(phenylene ethylene) (PPE). Suitable poly glucosides may include octyl glucoside. Other suitable non-ionic surfactants may include long-chain alkyl amines, such as primary alkylamines and N,N-dimethyl alkylamines. Suitable primary alkylamines may include dodecylamine and hexadecylamine. Suitable N,N-dimethyl alkylamines may include N,N-dimethyl dodecylamine or N,N-dimethyl hexadecylamine.

As noted above, the templating agent can include crown ethers. Crown ethers are heterocyclic chemical compounds that include a ring that includes several ether groups. Suitable crown ethers may include oligomers of ethylene oxide, the repeating unit being ethyleneoxy, i.e., —$CH_2CH_2O$—. Useful members of this series may include the tetramer (n=4), the pentamer (n=5), and the hexamer (n=6). Crown ethers derived from catechol may be used in the templating agent.

Figure 3:
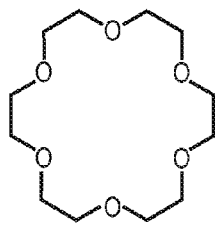
FIG. 3 depicts the chemical structure of a crown ether that can be used in the templating agent in accordance with the technique disclosed herein.

Crown ethers that strongly bind certain types of cations to form complexes may be included in the templating agents. The oxygen atoms in the crown ether may coordinate with a cation located at the interior of the ring, whereas the exterior of the ring may be hydrophobic. For example, 18-crown-6 has high affinity for potassium cation, 15-crown-5 for sodium cation, and 12-crown-4 for lithium cation. An exemplary crown ether is 18-crown-6 depicted in FIG. 3 as octylphenol ethoxylate, which is commercially available as TRITON™ X 114.

Suitable metal salts that may be used to form the water-in-oil microemulsion include the salts of transition metals. In one embodiment, metal salts may include one or more metals selected from silver, platinum, gold, palladium, iron, nickel, cobalt, or the like. Suitable salts may include halides, sulfates, nitrates, sulfides, or the like. An exemplary salt is silver nitrate.

The metal salt may be present in the water-in-oil microemulsion in an amount greater than about 0.1 weight percent, based on the total weight of the water-in-oil microemulsion. For example, the amount of the metal salt present may be between about 0.01 weight percent to 0.2 weight percent, 0.2 weight percent to 1 weight percent, 1 weight percent to 5 weight percent, 5 weight percent to 10 weight percent, 10 weight percent to 25 weight percent, 25 weight percent to 35 weight percent, 35 weight percent to 45 weight percent, 45 weight percent to 50 weight percent, or greater than about 50 weight percent. An exemplary amount of metal salt in the water-in-oil microemulsion is about 1.5 weight percent to 5 weight percent.

Figure 4:
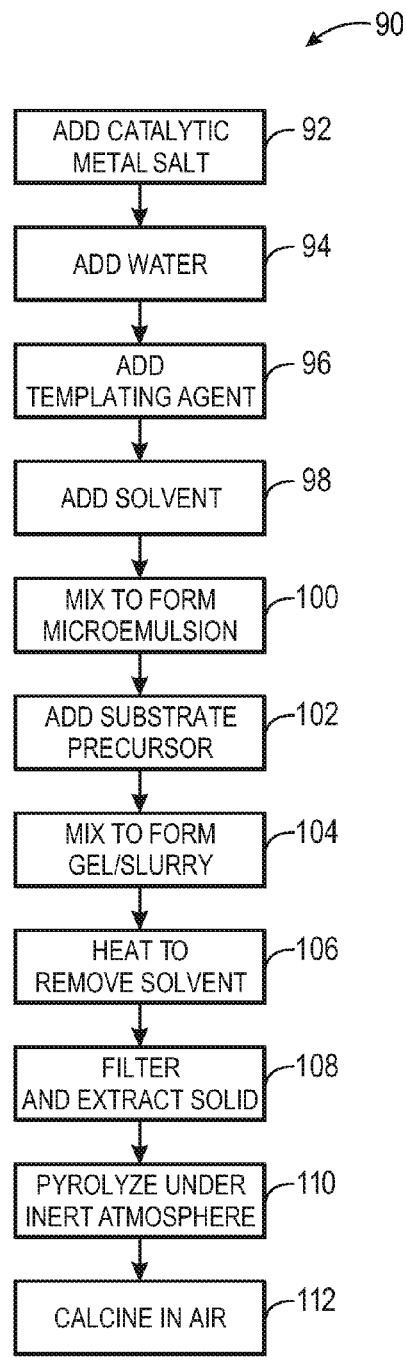
FIG. 4 is a flow chart that shows a process for manufacturing a catalyst in accordance with one embodiment of the present invention.

FIG. 4 is a flow chart 90 that shows an exemplary process for manufacturing an embodiment of the catalytic composition. In a first step 92, the catalytic metal salt is added to a vessel. In a second step 94, water is added to the vessel to achieve a desired concentration of the catalytic metal salt. In a third step 96, the templating agent is added to the vessel. In a fourth step 98, the solvent is added to the vessel. In certain embodiments, the steps 92, 94, 96, and/or 98 may be performed in a different order or simultaneously. In other embodiments, an optional modifier may be added in addition to the other components. In a fifth step 100, the contents of the vessel are mixed to form the water-in-oil microemulsion. In a sixth step 102, the substrate precursor is added to the water-in-oil microemulsion. In a seventh step 104, the vessel contents are mixed to form the slurry or gel. In certain embodiments, the steps 102 and 104 may be performed simultaneously. In other words, the vessel contents may continue to be mixed while the substrate precursor is added to the vessel. In an eighth step 106, the vessel contents are heated to vaporize the solvent, templating agent, and any other organics. In a ninth step 108, the remaining material in the vessel is removed and filtered to separate any remaining liquid from the solid that constitutes the catalyst composition. In a tenth step 110, the solid is pyrolyzed under an inert atmosphere, such as nitrogen, at a high temperature to further remove any remaining liquid. In certain embodiments, the tenth step 110 may be omitted. In an eleventh step 112, the solid is calcined in air at a high temperature to substantially remove any remaining liquid. The high temperature used during pyrolysis or calcination helps to vaporize any remaining solvent, templating agent, or organics. Further, the oxygen present in air during calcination may enable any remaining solvent, templating agent, or organics to be combusted. By performing pyrolysis prior to calcination, the amount of material that may be combusted during calcination is reduced.

The catalyst composition obtained from the method described above may be in powdered form. Alternatively, the catalyst composition may be manufactured in the form of a monolith. In one embodiment, the catalyst composition may be disposed on a prefabricated monolithic core. The prefabricated monolith core with the catalyst composition disposed thereon may be subjected to freeze-drying as well as to calcining to produce a monolithic catalyst composition.

After formation, the catalyst composition may be disposed in an exhaust gas stream of an automobile, a locomotive, or the like having $NO_x$ therein. The catalyst composition contacts and reduces $NO_x$ to nitrogen in the presence of a reductant, such as diesel fuel, during determined operating conditions. The catalyst composition may be disposed into the exhaust gas stream either in powdered form or in the form of a monolith.

EXAMPLES

The following examples illustrate methods and embodiments in accordance with the invention, and as such should not be construed as imposing limitations upon the claims. The examples demonstrate the manufacture of the catalyst compositions described herein and demonstrate their performance compared with other catalyst compositions that are commercially available. Unless specified otherwise, all components are commercially available from suitable chemical suppliers, such as Alpha Aesar, Incorporated of Ward Hill, Mass., Spectrum Chemical Manufacturing Corporation of Gardena, Calif., and the like.

Example 1

Manufacture of an Exemplary Catalyst Composition

The catalyst composition was designated as Sample 44-152-1. An amount of TRITON™ X-114 surfactant served as the templating agent. The catalyst composition was manufactured by making a first solution, a second solution, and a third solution, which were mixed together.

The first solution included $AgNO_3$ (0.50 g, 2.96 mmol) and 30 mL of water. These were combined in a 500 mL, 3-necked flask equipped with a syringe pump (Harvard Apparatus syringe pump 22), a condenser, and a mechanical stirrer. The second solution included TRITON™ X-114 (70.18 g), and cyclohexane (50 mL). The second solution was added to the first solution with stirring and held at an ambient temperature. The third solution included $Al(OBu)_3$ (46.9 g, 0.191 mol finally added) and was added to the first and second solutions via the syringe pump over a period of about 110 minutes. The resulting slurry or gel was stirred at ambient temperature for 6 hours. Then the mechanical stirrer was replaced with a stir bar and the contents were heated to reflux for 12 hours.

The contents were cooled and filtered. The obtained solid was subjected to Soxhlet extraction with ethanol. The extracted solid was dried in a vacuum oven at 30 mmHg and 100 degrees Celsius for 24 hours. The dry reaction product was heated under a flow of nitrogen (pyrolyzed) in a tube furnace from room temperature to 550 degrees Celsius at a heating rate of 2 degrees Celsius/minute. Once achieved, the temperature was maintained at 550 degrees Celsius for 1 hour. Afterward, the reaction product was calcined in a flow of air at 550 degrees Celsius for 5 hours to produce the catalyst composition.

Example 2

Manufacture of an Exemplary Catalyst Composition

The catalyst composition was designated as Sample B12. An amount of TRITON™ X-114 surfactant served as the templating agent. The catalyst composition was manufactured by making a first solution, a second solution, and a third solution, which were mixed together.

The first solution included cyclohexane (40 kg) and TRITON™ X-114 (7 kg). These were combined in a 379 L reactor equipped with a mechanical stirrer. The second solution included $AgNO_3$ (0.4 kg) and water (15 kg). The second solution was added to the first solution with stirring. The third solution included $Al(OBu)_3$ (25 kg) and was added to the first and second solutions via a pressurized container (ca. 15 psi nitrogen pressure) over a period of about 2.5 hours. The stirred slurry or gel was heated to 70 degrees Celsius for 24 hours.

The contents were subjected to filtration through a bag filter in a centrifuge to obtain a powder. The obtained solid was heated under a flow of nitrogen (pyrolyzed) in a tube furnace from room temperature to 550 degrees Celsius. Afterward, the reaction product was calcined in a flow of air at 550 degrees Celsius to produce the catalyst composition.

Test Conditions

The test conditions for the aforementioned catalyst composition of Example 1 are as follows. The catalyst was pretreated with 7 percent $H_2O$ and 9 percent $O_2$ for 7 hours at 450 degrees Celsius to "age" the catalyst. The sample from the example described above was disposed in a high throughput screen (HTS) reactor to determine its nitrogen oxide conversion capabilities in a simulated exhaust gas stream. The reactor had 32 tubes, each tube of which could receive a catalyst composition. No catalyst was placed in tube #1, which was used to measure the $NO_x$ concentration in the exhaust gas stream. The catalyst composition samples were placed in the other tubes and the reduction in $NO_x$ concentration was measured. The reduction in $NO_x$ concentration related to catalytic activity of the catalyst compositions.

The simulated exhaust gas stream included an exhaust gas composition and a reductant. Three samples of the catalyst were tested in each run and the catalyst was tested at three temperatures: 300 degrees Celsius, 350 degrees Celsius, and 400 degrees Celsius. The exhaust gas composition was 9 percent $O_2$, 300 ppm NO, 7 percent $H_2O$, and the balance $N_2$. The reductant used was a distillation cut (<210 degrees Celsius) of summer blend ultra low sulfur diesel (ULSD) fuel. For all the samples, using the HTS reactor, the $C_1$:NO ratio used in the exhaust gas composition was about 6 ($C_1$:NO is defined as the number of carbon atoms in the reductant stream per number of nitrogen oxide (NO) molecules).

Performance of the Exemplary Catalyst Compositions

FIG. 5 shows a graph 130 of the $NO_x$ conversion results for the sample from Example 1 described above relative to a comparative catalyst composition that does not include a substrate manufactured using exemplary techniques. An x-axis 132 represents temperature in degrees Celsius and a y-axis 134 represents the percent conversion of $NO_x$ to nitrogen and ammonia. Both catalysts were tested using the simulated exhaust gas stream as described above, which includes the distillation cut of the summer blend ULSD fuel.

With reference to FIG. 5, the sample manufactured according to an embodiment showed relatively better $NO_x$ conversion results 136 relative to the results 138 of the comparative catalyst composition. In FIG. 5, the $NO_x$ conversion for the exemplary sample was in a range of from about 55 percent to 75 percent. The comparative catalyst composition showed relatively lower conversion capabilities compared with the catalyst composition manufactured using the templating agent.

The exemplary catalyst composition reduced more than about 50 percent of the $NO_x$ present in the exhaust gas stream under determined use conditions. In one embodiment, the amount of $NO_x$ reduction is at least about 10 percent, at least about 15 percent, or at least about 20 percent relatively more than other comparative catalyst compositions. In addition, the catalytic performance for exemplary catalysts may be available over a temperature range of from about 200 degrees Celsius to 500 degrees Celsius. Exemplary catalyst compositions may reduce $NO_x$ while using reductants that include aromatic species or hydrocarbon species that on average have less than four carbon atoms per molecule, such as diesel fuel.

FIG. 6 shows a TEM image of the sample from Example 2 described above. As prepared, the sample from Example 2 has a silver content of approximately 4.5 mole percent. In the illustrated embodiment, arrows 150 point to observable silver clusters with diameters of approximately 8 nm. These silver clusters may correspond to the large catalytic metal clusters described above with respect to the TPR results. Thus, certain embodiments of catalytic compositions may have both small and large catalytic metal clusters, which may explain the unexpectedly improved performance of the exemplary catalytic compositions.

FIG. 7 shows a TEM image of a prior catalyst at approximately the same magnification level as that used in FIG. 6. As prepared, the sample of prior catalyst has the same silver content as the sample from Example 2, namely approximately 4.5 mole percent. However, in contrast to FIG. 6, there are no observable silver clusters for the prior catalyst. Thus, it appears that the prior catalyst may only have small catalytic metal clusters, which may explain why the activity of the prior catalyst is less than that of exemplary catalytic compositions as shown in FIG. 5.

With regard to the term "reaction product," reference is made to substances, components, or ingredients in existence at the time just before first contacted, formed in situ, blended, or mixed with one or more other substances, components, or ingredients in accordance with the present disclosure. A substance, component, or ingredient identified as a reaction product may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product.

All ranges disclosed herein are inclusive of the endpoints, and the endpoints are combinable with each other. The terms "first," "second," and the like as used herein do not denote any order, quantity, or importance, but rather are used to distinguish one element from another, unless otherwise indicated. The use of the terms "a" and "an" and "the" and similar referents in the context of describing the invention (especially in the context of the following claims) are to be construed to cover both the singular and the plural, unless otherwise indicated herein or contradicted by context.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A catalyst composition, comprising:
   a catalytic metal secured to a substrate, wherein the substrate has pores that are templated; and,
   a calcined product having distribution of clusters of catalytic metal atoms secured to the substrate,
   wherein the calcined product is prepared by a process comprising the steps of:
      mixing a catalytic metal salt, a templating agent, a solvent, and water to form a water-in-oil microemulsion,
      adding a substrate precursor to the water-in-oil microemulsion to form a slurry; and,
      calcining the slurry to form a substrate having a porous template that is capable of supporting the catalyst composition.

2. The catalyst composition of claim 1, wherein the catalytic metal comprises silver, gold, palladium, platinum, cobalt, nickel, iron, or a transition metal.

3. The catalyst composition of claim 1, wherein the catalytic metal comprises at least one promoting metal selected from the group consisting of gallium, indium, gold, vanadium, zirconium, zinc, tin, bismuth, cobalt, rhodium, platinum, molybdenum, and tungsten.

4. The catalyst composition of claim 1, wherein the pores have a single point pore volume of greater than about 0.5 cubic centimeters per gram.

5. The catalyst composition of claim 1, wherein the pores have an average diameter of greater than about 45 nanometers.

6. The catalyst composition of claim 1, wherein the surface area of the catalyst composition is greater than about 200 $m^2$/gram.

7. The catalyst composition of claim 1, wherein the catalytic metal is capable of reducing or eliminating $NO_x$ in an exhaust gas stream in contact therewith in the presence of diesel fuel at determined operating conditions.

8. A catalyst composition comprising:
   clusters of catalytic metal atoms secured to a substrate, wherein a first portion of the clusters of catalytic metal atoms are less than about 10 Angstroms and corresponds to clusters of less than about 3 catalytic metal atoms, and a second portion of clusters of catalytic metal atoms are greater than about 50 Angstroms and corresponds to clusters of greater than about 15 catalytic metal atoms.

9. A catalyst composition, comprising:
   a catalytic metal secured to a substrate, wherein the substrate has pores that are templated; and,
   a calcined product having distribution of clusters of catalytic metal atoms secured to the substrate.

* * * * *